United States Patent
DeRoller

(10) Patent No.: US 9,438,753 B2
(45) Date of Patent: Sep. 6, 2016

(54) METHOD AND APPARATUS FOR REDIRECTING PRINT JOB REQUESTS TO DIGITAL ALTERNATIVES

(71) Applicant: Xerox Corporation, Norwalk, CT (US)

(72) Inventor: Matthew H. DeRoller, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 14/181,948

(22) Filed: Feb. 17, 2014

(65) Prior Publication Data
US 2015/0237218 A1 Aug. 20, 2015

(51) Int. Cl.
*H04N 1/00* (2006.01)

(52) U.S. Cl.
CPC .......... *H04N 1/001* (2013.01); *H04N 1/00954* (2013.01); *H04N 2201/007* (2013.01); *H04N 2201/0015* (2013.01)

(58) Field of Classification Search
CPC ...... G06F 15/16; G06F 3/048; G06F 3/1206; G06F 3/1226; G06F 3/1247; G06F 3/126; G06F 3/1285; G06F 3/1292; H04L 12/2809; H04M 1/2478; H04W 4/12; H04W 76/02; H04W 88/02; H04N 1/001; H04N 1/00954; H04N 2201/0015; H04N 2201/007

USPC .................................................. 358/1.15, 1.1
See application file for complete search history.

(56) References Cited

U.S. PATENT DOCUMENTS

| | | | |
|---|---|---|---|
| 2002/0051200 A1* | 5/2002 | Chang et al. ................ | 358/1.15 |
| 2009/0168100 A1* | 7/2009 | Huster .................. | G06F 3/1212 358/1.15 |
| 2011/0242576 A1* | 10/2011 | Allen et al. .................. | 358/1.15 |
| 2014/0204404 A1* | 7/2014 | Malik .................. | G06F 3/1261 358/1.14 |
| 2014/0233055 A1* | 8/2014 | Eizenberg ............. | G06F 3/1296 358/1.15 |

* cited by examiner

*Primary Examiner* — Iriana Cruz

(57) ABSTRACT

A method, non-transitory computer readable medium, and apparatus for redirecting a print job request are disclosed. For example, the method receives a print job request, converts the print job request into a format of a digital alternative, analyzes the print job request to obtain one or more print job parameters, applies one or more print rules to the one or more print job parameters to determine that the print job request should be redirected to the digital alternative, provides an option to redirect the print job request to the digital alternative and provides the digital alternative when the option to redirect the print job request to the digital alternative is selected.

15 Claims, 3 Drawing Sheets

METHOD AND APPARATUS FOR REDIRECTING PRINT JOB REQUESTS TO DIGITAL ALTERNATIVES

The present disclosure relates generally to management of print jobs and, more particularly, to a method and an apparatus for redirecting print job requests to digital alternatives.

BACKGROUND

Customers are moving to managed print services that control how employees of an enterprise print. Currently, most managed print services only address how to save customers money and reduce costs by managing how the request is printed or where the request is printed. For example, some printers may be more cost effective than others and print jobs may be redirected towards the more cost effective printers. In other examples, print job requests can be modified to black and white if color is not necessary, and so forth. Thus, although current managed print services aim to reduce costs, the current managed print services achieve cost reduction while still printing the print job request.

SUMMARY

According to aspects illustrated herein, there are provided a method, a non-transitory computer readable medium, and an apparatus for redirecting a print job request. One disclosed feature of the embodiments is a method that receives a print job request, converts the print job request into a format of a digital alternative, analyzes the print job request to obtain one or more print job parameters, applies one or more print rules to the one or more print job parameters to determine that the print job request should be redirected to the digital alternative, provides an option to redirect the print job request to the digital alternative and provides the digital alternative when the option to redirect the print job request to the digital alternative is selected.

Another disclosed feature of the embodiments is a non-transitory computer-readable medium having stored thereon a plurality of instructions, the plurality of instructions including instructions which, when executed by a processor, cause the processor to perform an operation that receives a print job request, converts the print job request into a format of a digital alternative, analyzes the print job request to obtain one or more print job parameters, applies one or more print rules to the one or more print job parameters to determine that the print job request should be redirected to the digital alternative, provides an option to redirect the print job request to the digital alternative and provides the digital alternative when the option to redirect the print job request to the digital alternative is selected.

Another disclosed feature of the embodiments is an apparatus comprising a processor and a computer readable medium storing a plurality of instructions which, when executed by the processor, cause the processor to perform an operation that receives a print job request, converts the print job request into a format of a digital alternative, analyzes the print job request to obtain one or more print job parameters, applies one or more print rules to the one or more print job parameters to determine that the print job request should be redirected to the digital alternative, provides an option to redirect the print job request to the digital alternative and provides the digital alternative when the option to redirect the print job request to the digital alternative is selected.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for redirecting print job requests. As discussed above, customers are moving to managed print services that control how employees of an enterprise print. Currently, most managed print services only address how to save customers money and reduce costs by managing how the request is printed or where the request is printed. For example, some printers may be more cost effective than others and print jobs may be redirected towards the more cost effective printers. In other examples, print job requests can be modified to black and white if color is not necessary, and so forth. Thus, although current managed print services aim to reduce costs, the current managed print services achieve cost reduction while still printing the print job request.

However, none of managed print services look to reduce costs by eliminating printing that would result in less revenue. However, less print revenue may be offset by gains in service revenue by helping customers move from a paper-centric workflow to a process-centric workflow.

One embodiment of the present disclosure provides additional cost savings to customers by providing an option to redirect print job requests to digital alternatives. In other words, the greatest cost savings may be achieved by not printing the print job request at all. Rather, users and requestors may be encouraged to use digital alternatives that can share all the properties of a printed hard copy of a document. For example, the digital alternative may be electronically portable, shared with other users (e.g., via email), annotated, archived or stored for later retrieval or reading, and the like.

Figure 1:
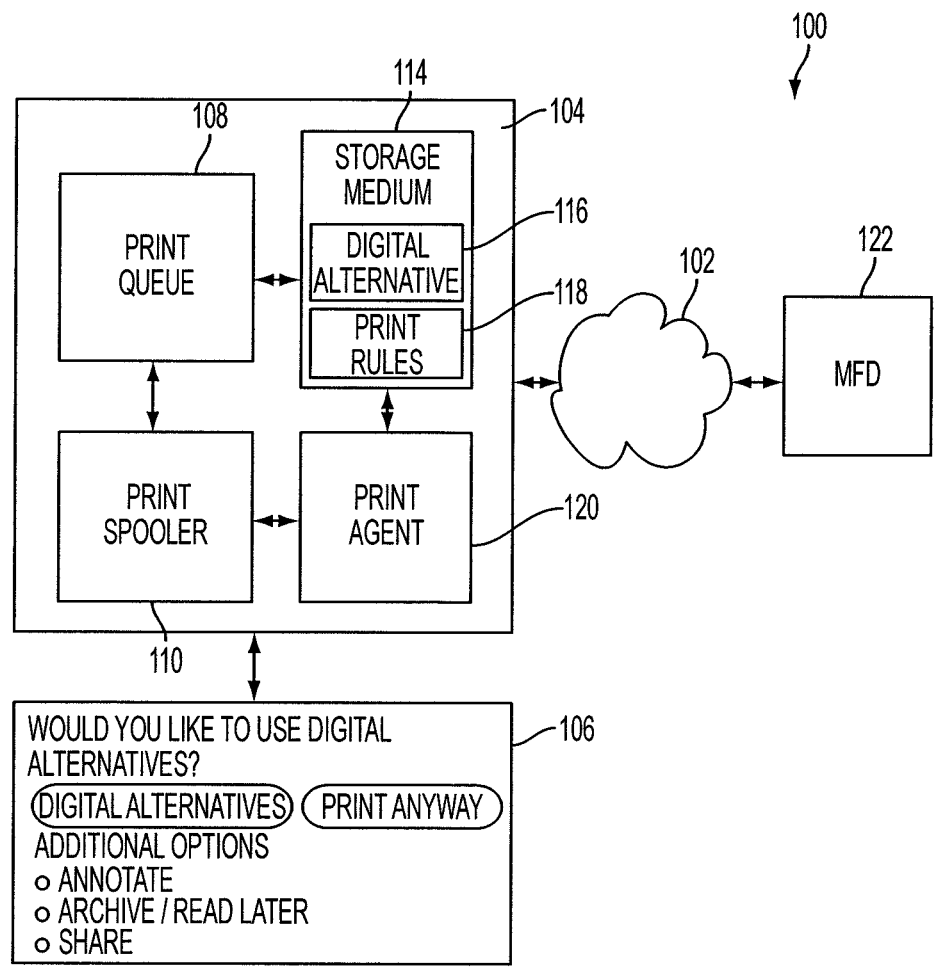
FIG. 1 illustrates an example block diagram of a system of the present disclosure.

FIG. 1 illustrates an example system 100 of the present disclosure. In one embodiment, the system 100 may include an endpoint device 104 in communication with a multifunction device (MFD) 122 via a network 102. In one embodiment, network 102 may be an Internet Protocol (IP) network, a local area network, a wide area network, and the like. The network 102 may include additional access networks or network elements (not shown).

In one embodiment, the MFD 122 may be a printer, a copying machine with remote printing capabilities, a fax machine, and the like. In one embodiment, the MFD 122 may be located remotely from the endpoint 104. In one embodiment, the MFD 122 may be part of a print governance service or a managed print service provided by a service provider.

In one embodiment, the endpoint device 104 may be any type of endpoint device including for example a desktop computer, a laptop computer, a tablet computer, a smart phone, and the like. In one embodiment, the methods and functions performed herein for redirecting a print job request may be performed locally at a printer or MFD. Thus, the endpoint 104 may also be a printer or MFD with a graphical user interface, and the like.

In one embodiment, the endpoint device 104 may include a print queue 108, a print spooler 110, a storage medium 114 and a print agent 120. In one embodiment, the print queue 108 may store a list of all print job requests within a managed print service. In one embodiment, the print queue 108 may be in communication with the print spooler 110. The print spooler 110 may be in communication with the print agent 120. In one embodiment, the print agent 120 may be a software application or client that is run on the endpoint device 104.

In one embodiment, the print agent 120 may analyze or parse the print job requests sent to the print spooler 110 to obtain page description language (PDL) data. The print agent 120 may then apply one or more print rules 118 stored in the storage medium 114 to the PDL data to determine if a print job request should be redirected to digital alternatives. The print agent 120 may also control, or initiate, the conversion of the print job request to the format for the digital alternative 116 and send a message to a display 106 to inform the requestor that the print job request should be redirected to the digital alternative 116, as discussed below.

In one embodiment, once the print job request is sent to the print queue 108, the print job request may be immediately converted into a format of a digital alternative 116 and stored in the storage medium 114. As a result, if a requestor of the print job request accepts the digital alternative rather than printing a document of the print job request, the digital alternative 116 may be immediately provided to the requestor. In other words, the amount of time the requestor needs to wait for the digital alternative 116 is minimized since the digital alternative 116 was previously created as soon as the print job request was submitted to the print queue 108.

In one embodiment, the digital alternative 116 may be any format that provides a portable electronic document (e.g., a portable document format (.pdf file), a word processing compatible format, a JPEG image, and the like). In addition, the digital alternative 116 may allow the requestor to annotate the portable electronic document, store or archive the portable electronic document for later retrieval or reading and/or share the portable electronic document with other users via email, instant messaging, and the like.

The print rules 118 may provide various rules to determine if a print job request should be redirected to the digital alternative 116. In one embodiment, the print rules 118 may be based upon a cost of the print job request. For example, the print agent 120 may calculate an estimated cost to print the document or documents in the print job request based upon the PDL data. The costs may be calculated based on one or more parameters including, for example, whether the document is to be printed in black and white or in color, a number of pages, a type of paper, whether the document is text or includes images, a type of printer being used, a cost of ink used by the printer, and the like. If the estimated cost of the print job request is greater than a cost threshold, the print agent 120 may determine that the print job request should be redirected to the digital alternative 116.

In another embodiment, the print rules 118 may be based upon a security parameter. For example, the print rules 118 may include a list of one or more printers that are considered to be secure. For example, "secure" printers may be printers that are located in a same location or room as the requestor. For example, a remotely located printer in another office building or another floor may not be secure because another individual may intercept the printed document before the requestor is able to retrieve the document. Thus, if the print agent 120 determines that the print job request is using a printer that is not considered to be in a secure location then the print agent 120 may determine that the print job request should be redirected to the digital alternative 116.

In one embodiment, the print rules 118 may be based upon a frequency of print job requests sent by a requestor. For example, if the requestor has X number of print job requests within a predefined time period (e.g., more than 20 print job requests in 24 hours or more than 100 print job requests in one week), the print rules 118 may redirect all subsequent print job requests from the same requestor to the digital alternative 116. It should be noted that other print rules 118 may be used that are not discussed herein without departing from the scope of the present disclosure.

In one embodiment, when the requestor is encouraged to redirect the print job request to the digital alternative 116, a message may be presented to the requestor in the display 106 of the endpoint device 104. In one embodiment, the display 106 may be an external monitor of a desktop computer, a touch screen of a tablet computer or smart phone, a display of a MFD, and the like.

In one embodiment, the message on the display 106 may inform the requestor that the print job request should be redirected to the digital alternative 116. The requestor may be provided an option to select the digital alternative or to continue with printing the document. In one embodiment, the print rules 118 may be set to always provide the option to use the digital alternative 116. In another embodiment, if the print agent 120 determines that the print job request should be redirected, the message on the display 106 may not provide an option to print. In other words, the requestor may be required to use the digital alternative 116.

In one embodiment, the message on the display 106 may include additional options to annotate the digital alternative 116, to archive or read later the digital alternative 116 and/or share the digital alternative 116. For example, the requestor may be asked to specify a file path to save the digital alternative 116 or provide one or more addresses (e.g., an email address, a user name, and the like) to share the digital alternative 116 via email or a messaging service.

In one embodiment, if the requestor decides to print the document associated with the print job request, the digital alternative 116 may be deleted from the storage medium 114. In another embodiment, if the requestor selects the digital alternative 116, the print job request may be deleted from the print spooler 110 and the print job request may be canceled. In other words, when the digital alternative 116 is selected, the print job request is not printed.

As a result, the present disclosure may discourage users from printing documents. Rather, the present disclosure may encourage users to save costs by using digital alternatives. In some embodiments, the digital alternatives may be used when specific conditions or rules are meant, for example, when costs savings can be achieved or if a potential security issue may arise.

Figure 2:
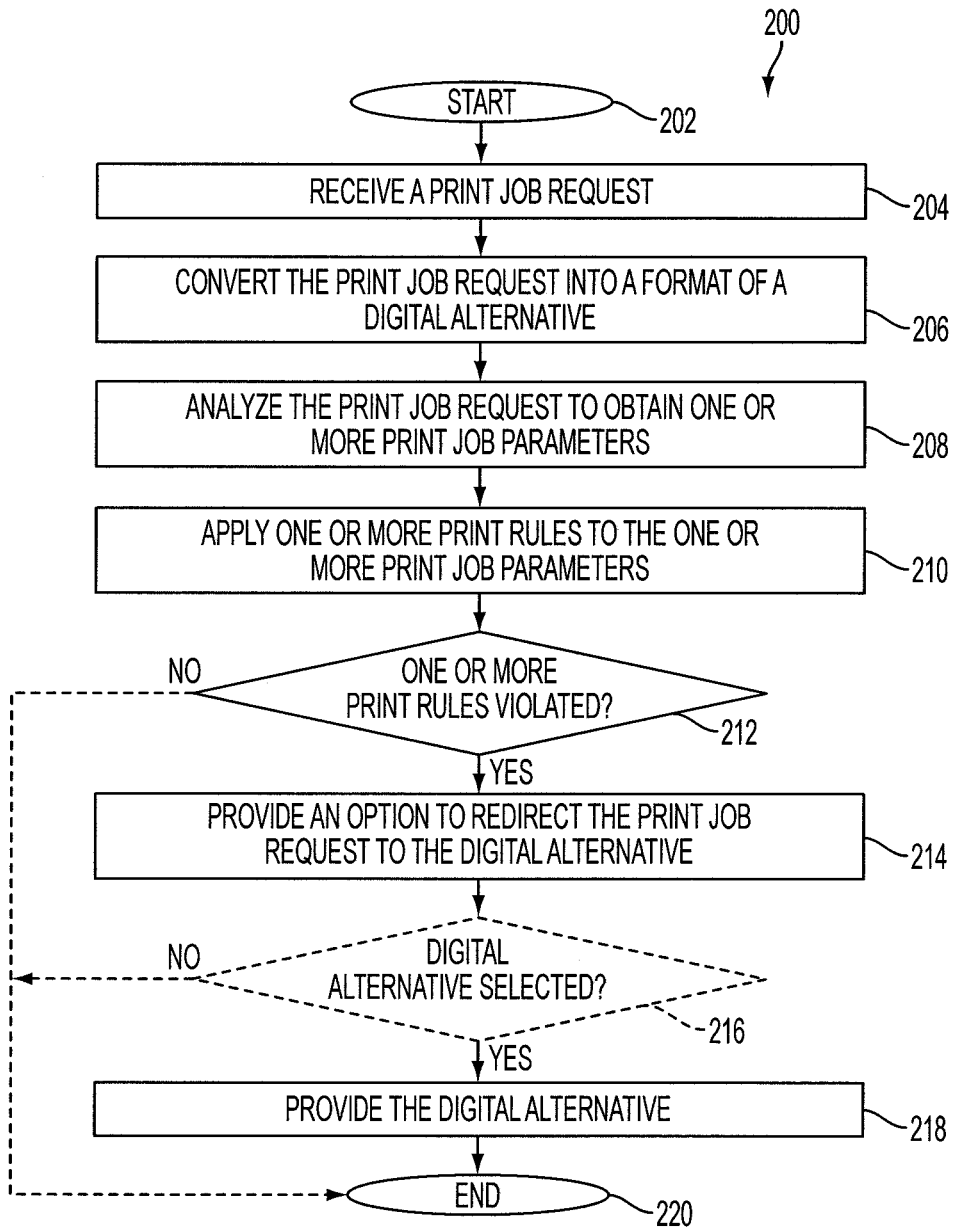
FIG. 2 illustrates an example flowchart of a method for redirecting a print job request.
Figure 3:
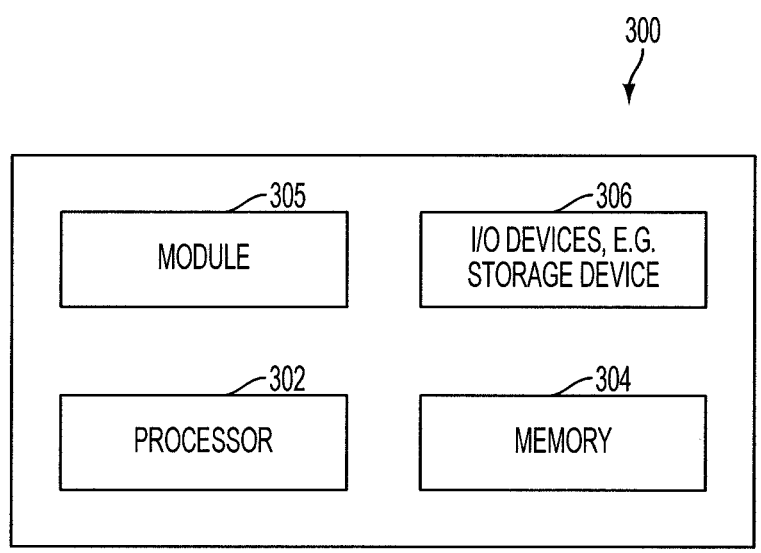
FIG. 3 illustrates a high-level block diagram of a general-purpose computer suitable for use in performing the functions described herein.

FIG. 2 illustrates a flowchart of a method 200 for redirecting a print job request. In one embodiment, one or more steps or operations of the method 200 may be performed by the endpoint 104 or a general-purpose computer as illustrated in FIG. 3 and discussed below.

At step 202 the method 200 begins. At step 204, the method 200 receives a print job request. For example, a requestor or user may submit a print job request for printing one or more documents.

At step 206, the method 200 converts the print job request into a format of a digital alternative. For example, the document or documents associated with the print job request are immediately converted into the digital alternative format before the print job request is sent to the print spooler. In one embodiment, the format of the digital alternative may be any format that provides a portable electronic document (e.g., a portable document format (.pdf file)). In addition, the digital alternative 116 may allow the requestor to annotate the portable electronic document, store or archive the portable electronic document for later retrieval or reading and/or share the portable electronic document with other users via email, instant messaging, and the like.

At step 208, the method 200 analyzes the print job request to obtain one or more print job parameters. For example, PDL data associated with the print job request may be parsed to calculate an estimated cost of the print job request or security information associated with the print job request (e.g., a printer that is requested or a location of the printer that requested, and the like).

At step 210, the method 200 applies one or more print rules to the one or more print job parameters. In one embodiment, the print rules may provide various rules to determine if a print job request should be redirected to the digital alternative. In one embodiment, the print rules may be based upon a cost of the print job request. For example, the estimated cost to print the document or documents in the print job request based upon the PDL data may be compared to a cost threshold in the print rules. If the estimated cost of the print job request is greater than the cost threshold, the method 200 may determine that the print job request should be redirected to the digital alternative.

In another embodiment, the print rules may be based upon a security parameter. For example, the print rules may include a list of one or more printers that are considered to be secure. For example, "secure" printers may be printers that are located in a same location or room as the requestor. For example, a remotely located printer in another office building or another floor may not be secure because another individual may intercept the printed document before the requestor is able to retrieve the document. Thus, if the print job request is using a printer that is not considered to be in a secure location, then the method 200 may determine that the print job request should be redirected to the digital alternative.

In another embodiment, the print rules may be based upon a frequency of print job requests sent by a requestor. For example, if the requestor has X number of print job requests within a predefined time period (e.g., more than 20 print job requests in 24 hours or more than 100 print job requests in one week), the method 200 may redirect all subsequent print job requests from the same requestor to the digital alternative. It should be noted that other print rules may be used that are not discussed herein without departing from the scope of the present disclosure.

At step 212, the method 200 determines if one or more print rules are violated. In one embodiment, the "no" decision may be optional. In other words, to save costs on printing, the default rule may be that the print rules are always violated (i.e., the step 212 is always "yes" and never "no") such that the option to provide a digital alternative is always provided. If "no" is an option, and the answer to step 212 is no, the method 200 may allow the print job request to be printed and proceed to step 220 where the method 200 ends.

However, at step 212 if the answer is "yes", the method 200 may proceed to step 214. At step 214, the method 200 provides an option to redirect the print job request to the digital alternative. In one embodiment, a message may be displayed to the requestor on a display indicating that the print job request should be redirected to the digital alternative. The message on the display may provide an option to select the digital alternative or to continue with printing the document.

In one embodiment, the message on the display may include additional options to annotate the digital alternative, to archive or read later the digital alternative and/or share the digital alternative. For example, the requestor may be asked to specify a file path to save the digital alternative or provide one or more addresses (e.g., an email address, a user name, and the like) to share the digital alternative via email or a messaging service.

At optional step 216, the method 200 may determine if the digital alternative is selected. For example, the user may be provided with an option to print the print job request anyways even if a print rule is violated, as discussed above. In another embodiment, the step 216 may be optional because the requestor may not be provided an option to print the print job request even if the print rules are violated. In other words, the requestor may be required to, or forced, to select the digital alternative.

At optional step 216 if the answer is "no", the requestor does not select the digital alternative. The print job request may be kept in the print queue and the print job request may be sent to the multi-function device or printer for printing. The method 200 proceeds to step 220 where the method 200 ends.

However, if the answer is "yes" at optional step 216, the method 200 may proceed to step 218. At step 218, the method 200 provides the digital alternative. In one embodiment, the digital alternative that was previously converted and stored in step 206 may be provided to the requestor immediately. In other words, the wait time of the requestor is minimized because the conversion does not occur when the requestor selects the digital alternative. Rather, the efficiency of the process is improved assuming that the requestor may want the digital alternative rather than printing the document and converting the print job request into the digital alternative in advance.

In one embodiment, when the digital alternative is selected, the print job request may be deleted from the print spool and the print job request is not printed. At step 220, the method 200 ends.

It should be noted that although not explicitly specified, one or more steps, functions, or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for redirecting a print job request, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for redirecting a print job request (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for redirecting a print job request (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for redirecting a print job request, comprising:
   receiving, by a processor, the print job request;
   converting, by the processor, the print job request into a format of a digital alternative before the print job request is sent to a print spooler to be analyzed, wherein the format comprises a portable document format;
   analyzing, by the processor, the print job request to obtain one or more print job parameters;
   applying, by the processor, one or more print rules to the one or more print job parameters to determine that the print job request should be redirected to the digital alternative, wherein the applying comprises:
      determining, by the processor, a cost of the print job request based on the one or more print job parameters; and
      determining, by the processor, that the cost is greater than a cost threshold of the one or more print rules;
   providing, by the processor, an option to redirect the print job request to the digital alternative in response to the cost of the print job request being greater than the cost threshold; and
   providing, by the processor, the digital alternative when the option to redirect the print job request to the digital alternative is selected, wherein a client on an endpoint device performs the receiving, the converting, the analyzing, the applying, the providing the option and the providing the digital alternative before the print job request is sent to a printer.

2. The method of claim 1, wherein the option further comprises an additional option to share the digital alternative.

3. The method of claim 1, wherein the option further comprises an additional option to archive the digital alternative.

4. The method of claim 1, wherein the option further comprises an additional option to annotate the digital alternative.

5. The method of claim 1, wherein the applying further comprises:
   determining, by the processor, that the print job request is being routed to a printer that is not considered to be in a secure location based upon the one or more print rules.

6. The method of claim 1, further comprising:
   deleting, by the processor, the print job request from the print spooler and not printing the print job request when the option to redirect the print job request to the digital alternative is selected.

7. The method of claim 1, further comprising:
   deleting, by the processor, the digital alternative when the option to redirect the print job request to the digital alternative is not selected.

8. A non-transitory computer-readable medium storing a plurality of instructions which, when executed by a processor, cause the processor to perform operations for redirecting a print job request, the operations comprising:
receiving the print job request;
converting the print job request into a format of a digital alternative before the print job request is sent to a print spooler to be analyzed, wherein the format comprises a portable document format;
analyzing the print job request to obtain one or more print job parameters;
applying one or more print rules to the one or more print job parameters to determine that the print job request should be redirected to the digital alternative, wherein the applying comprises:
determining a cost of the print job request based on the one or more print job parameters; and
determining that the cost is greater than a cost threshold of the one or more print rules;
providing an option to redirect the print job request to the digital alternative in response to the cost of the print job request being greater than the cost threshold; and
providing the digital alternative when the option to redirect the print job request to the digital alternative is selected, wherein a client on an endpoint device performs the receiving, the converting, the analyzing, the applying, the providing the option and the providing the digital alternative before the print job request is sent to a printer.

9. The non-transitory computer-readable medium of claim 8, wherein the option further comprises an additional option to share the digital alternative.

10. The non-transitory computer-readable medium of claim 8, wherein the option further comprises an additional option to archive the digital alternative.

11. The non-transitory computer-readable medium of claim 8, wherein the option further comprises an additional option to annotate the digital alternative.

12. The non-transitory computer-readable medium of claim 8, wherein the applying further comprises:
determining that the print job request is being routed to a printer that is not considered to be in a secure location based upon the one or more print rules.

13. The non-transitory computer-readable medium of claim 8, further comprising:
deleting the print job request from the print spooler and not printing the print job request when the option to redirect the print job request to the digital alternative is selected.

14. The non-transitory computer-readable medium of claim 8, further comprising:
deleting the digital alternative when the option to redirect the print job request to the digital alternative is not selected.

15. A method for redirecting a print job request, comprising:
receiving, by a processor, the print job request;
converting, by the processor, the print job request into a digital alternative in a portable electronic document format before the print job request is sent to a print spooler to be analyzed for reading the digital alternative at a later time, for sharing the digital alternative electronically with another user or annotating the digital alternative;
storing, by the processor, the digital alternative in an endpoint device of a requestor of the print job request without showing the digital alternative to the requestor;
analyzing, by the processor, the print job request to obtain one or more print job parameters;
applying, by the processor, one or more print rules to the one or more print job parameters to determine that the print job request should be redirected to the digital alternative due to a violation of a cost threshold or a potential security breach associated with the one or more print rules;
providing, by the processor, an option to redirect the print job request to the digital alternative in response to a cost of the print job request violating the cost threshold or the potential security breach;
providing, by the processor, the digital alternative that was previously stored when the option to redirect the print job request to the digital alternative is selected;
deleting, by the processor, the print job request from a print queue; and
notifying, by the processor, the requestor that the print job request was not printed, wherein a client on an endpoint device performs the receiving, the converting, the storing, the analyzing, the applying, the providing the option, the providing the digital alternative, the deleting and the notifying before the print job request is sent to a printer.

* * * * *